US006887840B2

(12) United States Patent
Miller

(10) Patent No.: US 6,887,840 B2
(45) Date of Patent: May 3, 2005

(54) IRON SULFIDE CLEAN-UP COMPOSITION AND METHOD

(75) Inventor: Andy R. Miller, Artesia, NM (US)

(73) Assignee: Milborn Enterprises LLC, Artesia, NM (US)

( * ) Notice: Subject to any disclaimer, the term of this patent is extended or adjusted under 35 U.S.C. 154(b) by 284 days.

(21) Appl. No.: 10/347,057

(22) Filed: Jan. 21, 2003

(65) Prior Publication Data

US 2004/0142845 A1 Jul. 22, 2004

(51) Int. Cl.$^{7}$ .......................... C11D 17/50; H01M 2/16; G11B 5/738

(52) U.S. Cl. ....................... 510/365; 507/268; 507/932; 507/939; 166/902; 510/401

(58) Field of Search ................................ 510/365, 401; 507/268, 932, 939; 166/902

(56) References Cited

U.S. PATENT DOCUMENTS

| | | | | | |
|---|---|---|---|---|---|
| 4,220,550 | A | * | 9/1980 | Frenier et al. | 510/264 |
| 4,501,668 | A | * | 2/1985 | Merk et al. | 210/749 |
| 4,978,512 | A | * | 12/1990 | Dillon | 423/226 |
| 5,462,721 | A | * | 10/1995 | Pounds et al. | 423/226 |
| 6,068,056 | A | * | 5/2000 | Frenier et al. | 166/307 |

* cited by examiner

*Primary Examiner*—Gregory Webb
(74) *Attorney, Agent, or Firm*—Baker Botts L.L.P.

(57) ABSTRACT

An iron sulfide cleaning composition is described, along with a process for using the iron sulfide cleaning composition. The iron sulfide cleaning composition is simple to use and effective in removing deposits of iron sulfide from hydrocarbon wells. The iron sulfide cleaning composition consists of formaldehyde or glutaraldehyde, methanol, 2-butoxyethanol, isopropyl alcohol, hydrochloric acid, Surfactant Intermediate, Surfactant/Corrosion Inhibitor, glacial acetic acid and water.

2 Claims, No Drawings

IRON SULFIDE CLEAN-UP COMPOSITION AND METHOD

FIELD OF THE INVENTION

The present invention relates to chemical compositions and their use in removing iron-sulfide waste products from hydrocarbon wells.

BRIEF SUMMARY OF THE INVENTION

The present invention describes a composition capable of cleaning iron sulfide deposits from hydrocarbon wells and methods of using that composition. One embodiment of the present invention describes an iron-sulfide cleaning composition containing:

a. about 6.7% formaldehyde or glutaraldehyde;
b. about 11.5% methanol;
c. about 3.6% 2-butoxyethanol;
d. about 1.8% isopropyl alcohol;
e. about 9.1% hydrochloric acid;
f. about 6.5% Surfactant Intermediate
g. about 6.5% Surfactant/Corrosion Inhibitor
h. about 6.5% glacial acetic acid; and
i. about 47.8% water.

Another embodiment of the present invention describes a method of cleaning iron sulfide deposits from a well wherein the well is first shut down, and then 275 gallons of the above-described iron sulfide cleaning composition and from 2900 to 5000 gallons of either water or a 2% solution of potassium chloride are added to the well. The well is then left shut in for at least 12 hours, after which normal production is resumed.

DETAILED DESCRIPTION OF THE INVENTION

Iron sulfide deposits in a well bore can cause a variety of corrosion and operational problems. These include: rapid productivity decline in oil and gas wells; loss of injectivity in water injection wells; pump failures; underdeposit corrosion; fouled pipelines and equipment; interfacial pads; and, poor water quality. Thus, it is advantageous to periodically remove iron sulfide deposits from a producing well.

The iron sulfide cleaning composition of the present invention involves the use of a mixture of basic chemicals in water:

Formaldehyde or Glutaraldehyde: The composition of the present invention includes about 6.7% of either formaldehyde or glutaraldehyde, both of which act as biocides.

Methanol: The composition of the present invention includes about 11.5% methanol, which acts as a cleaning agent to remove hydrocarbons off from iron.

2-butoxyethanol ("EB"): The composition of the present invention includes about 3.6% EB, which acts as a surfactant.

Isopropyl Alcohol: The composition of the present invention includes about 1.8% isopropyl alcohol, which acts as a cleaning agent to remove hydrocarbons off from iron.

Hydrochloric Acid: The composition of the present invention includes about 9.1% hydrochloric acid, which acts to chemically dissolve iron.

Surfactant Intermediate: The Surfactant Intermediate used in the present invention is comprised of ammonium salt of sulfated nonylphenopxy(branched) ethyleneoxy ethanol. The composition of the present invention includes about 6.5% of the surfactant intermediate, which acts penetrate hydrocarbon molecules.

Surfactant/Corrosion Inhibitor: The Surfactant/Corrosion Inhibitor of the present invention is an intermediate comprised of quaternary ammonium chloride and isopropanol. The composition of the present invention includes about 6.5% Surfactant/Corrosion Inhibitor.

Glacial Acetic Acid: The composition of the present invention includes about 6.5% glacial acetic acid, which acts to chemically dissolve iron.

The present invention represents an improvement over the inventor's prior iron sulfide cleaning composition, used more than one year before the filing of this application. The inventor has sold an iron sulfide clean-up composition wherein customers combined 55 gallons of a methanol/formaldehyde solution, 55 gallons of solution of an alcohol/hydrochloric acid solution, 54 gallons of a surfactant/acetic acid solution and 111 gallons of water. That methanol/formaldehyde solution contained 20 gallons of formaldehyde and 35 gallons of methanol. That alcohol/hydrochloric acid solution contained 10 gallons of 2-butoxyethanol, 5 gallons of isopropyl alcohol, 20 gallons of 32.5% hydrochloric acid and 20 gallons of water. The surfactant/acetic acid solution contained 18 gallons of Surfactant Intermediate, 18 gallons of Surfactant/Corrosion Inhibitor and 18 gallons of glacial acetic acid. The final composition contained 2-butoxyethanol, isopropyl alcohol, Surfactant Intermediate, Surfactant/Corrosion Inhibitor, glacial acetic acid, water, methanol, formaldehyde and hydrochloric acid wherein the mixture was 12.6% methanol, 7.4% formaldehyde and 7.3% hydrochloric acid.

By contrast, the iron sulfide cleaning composition of the present invention contains 10 gallons of 2-butoxyethanol, 5 gallons of isopropyl alcohol, 25 gallons of 32.5% hydrochloric acid, 18 gallons of Surfactant Intermediate, 18 gallons of Surfactant/Corrosion Inhibitor, 18 gallons of glacial acetic acid, 18 gallons of formaldehyde and 32 gallons of methanol. Thus, the final composition contains 3.6% 2-butoxyethanol, 1.8% isopropyl alcohol, 6.5% Surfactant Intermediate, 6.5% Surfactant/Corrosion Inhibitor, 6.5% glacial acetic acid and 47.8% water, 11.5% methanol, 6.7% formaldehyde and 9.1% hydrochloric acid. By so lowering the level of formaldehyde and increasing the level of hydrochloric acid, the composition of the present invention is more effective in removing iron sulfide than the previous composition.

The iron sulfide cleaning composition of the present invention can be advantageously used in a method of removing iron sulfide buildup from a hydrocarbon well. To effectively treat a well to remove iron sulfide buildup, the operator first shuts down the well. The operator then inserts 275 gallons of an iron sulfide cleaning composition consisting of about 6.7% formaldehyde, about 11.5% methanol, about 3.6% 2-butoxyethanol, about 1.8% isopropyl alcohol, about 9.1% hydrochloric acid, about 6.5% Surfactant Intermediate, about 6.5% Surfactant/Corrosion Inhibitor, about 6.5% glacial acetic acid and remainder water. Next, from about 2900 to about 5000 gallons of either water or a 2% potassium chloride solution is added to the well. Finally the well is shut in for at least 12 hours, after which normal production is resumed.

EXAMPLE

The inventor's prior iron sulfide cleaning composition was compared against the composition claimed in the present invention and the new composition was able to remove iron sulfide nearly 70% faster than the prior composition.

Prior Composition: Fifty milliliters of the prior iron sulfide cleaning composition was placed in a 250 milliliter beaker with 0.5 grams of dry iron sulfide. The prior iron sulfide cleaning composition totally dissolved the iron sulfide in 2 minutes and 25 seconds.

Claimed Composition: Fifty milliliters of the claimed iron sulfide cleaning composition was placed in a 250 milliliter beaker with 0.5 grams of dry iron sulfide. The claimed iron sulfide cleaning composition totally dissolved the iron sulfide in 1 minute and 38 seconds.

What is claimed is:

1. A iron sulfide cleaning composition consisting essentially of:

i. about 6.7% formaldehyde or glutaraldehyde;

ii. about 11.5% methanol;

iii. about 3.6% 2-butoxyethanol;

iv. about 1.8% isopropyl alcohol;

v. about 9.1% hydrochloric acid;

vi. about 6.5% Surfactant Intermediate;

vii. about 6.5% Surfactant/Corrosion Inhibitor;

viii. about 6.5% glacial acetic acid; and, ix. about 47.8% water.

2. A method of removing iron sulfide deposits from a hydrocarbon well comprising:

a. shutting in the well b. inserting about 275 gallons of an iron sulfide cleaning composition consisting essentially of:
   i. about 6.7% formaldehyde or glutaraldehyde;
   ii. about 11.5% methanol;
   iii. about 3.6% 2-butoxyethanol;
   iv. about 1.8% isopropyl alcohol;
   v. about 9.1% hydrochloric acid;
   vi. about 6.5% Surfactant Intermediate;
   vii. about 6.5% Surfactant/Corrosion Inhibitor;
   viii. about 6.5% glacial acetic acid; and,
   about 47.8% water;

c. inserting from about 2900 to about 5000 gallons of either water or a 2% potassium chloride solution; and, d. allowing the well to remain shut in for at least 12 hours.

* * * * *